(12) United States Patent
McBurney et al.

(10) Patent No.: US 6,559,795 B1
(45) Date of Patent: May 6, 2003

(54) HIGH-SENSITIVITY INFREQUENT USE OF SERVERS

(75) Inventors: Paul W. McBurney, San Francisco, CA (US); Kenneth U. Victa, San Francisco, CA (US)

(73) Assignees: Seiko Epson Corporation, Tokyo (JP); eRide, Inc., San Francisco, CA (US)

(*) Notice: Subject to any disclaimer, the term of this patent is extended or adjusted under 35 U.S.C. 154(b) by 0 days.

(21) Appl. No.: 10/079,247

(22) Filed: Feb. 19, 2002

(51) Int. Cl.[7] ............................................... H04B 7/185
(52) U.S. Cl. .................................................. 342/357.12
(58) Field of Search ....................... 342/357.01, 357.06, 342/357.12, 357.15; 701/213, 215

(56) References Cited

U.S. PATENT DOCUMENTS 5,832,038 A * 11/1998 Carsello ..................... 375/316
6,313,786 B1 * 11/2001 Sheynblat et al. ...... 342/357.02
6,437,734 B1 * 8/2002 McBurney et al. ..... 342/357.09

* cited by examiner

Primary Examiner—Dao Phan

(57) ABSTRACT

A navigation-satellite receiver depends on a network server to occasionally provide key pieces of information needed during its initialization. The navigation-satellite receiver critically maintains its position uncertainty, sigmaPos, to under 150-km. Therefore, at least every five minutes, the navigation-satellite receiver uses a network connection to download all the ephemeris information for all the operational SV's. The power-off time uncertainty, sigmaTime, is kept under one millisecond by running a real-time clock with a software-compensated crystal oscillator reference. Such information is instantly available at power-up to reduce the time necessary to produce a first fix when receiver signal levels are under −150 dbm even for the strongest SV.

7 Claims, 2 Drawing Sheets

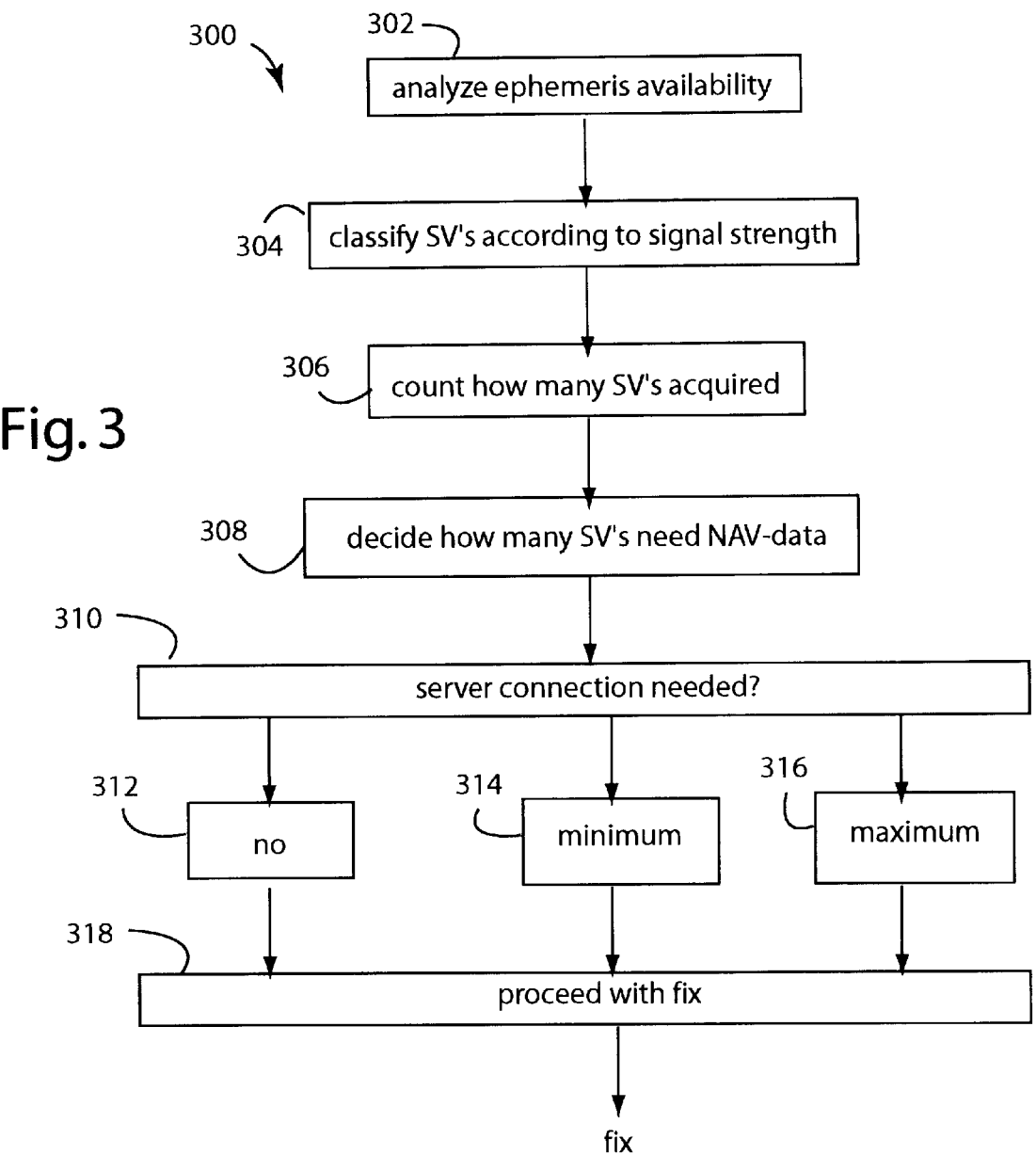

HIGH-SENSITIVITY INFREQUENT USE OF SERVERS

FIELD OF THE INVENTION

The present invention relates to navigation satellite receivers, and more particularly to methods and systems for infrequently supporting an otherwise completely autonomous client on a computer network.

DESCRIPTION OF THE PRIOR ART

The global positioning system (GPS) is a satellite-based radio-navigation system built and operated by the United States Department of Defense at a cost of over $13 billion. Twenty-four satellites circle the earth at an altitude of 20,200 km, and are spaced in orbit such that at any time a minimum constellation of six satellites is visible to any user. Each satellite transmits an accurate time and position signal referenced to an atomic clock. A typical GPS receiver locks on to this atomic clock, and then can very accurately measure the time delay for the signal to reach it, and the apparent receiver-satellite distance can then be calculated. Measurements from at least four satellites allow a GPS receiver to calculate its position, velocity, altitude, and time.

High-sensitivity GPS receivers are a problem when the initial time or frequency uncertainty is large. Finding signal energy when the signal energy is extremely faint requires making smaller steps and dwelling at each step longer. So having a better initial estimate of the local reference oscillator can improve time-to-first-fix.

GPS receivers with signal levels better that −145 dbm can readily lock onto a strong GPS satellite vehicle (SV) to decode the NAV-data. Such yields the SV ephemeris and position. After than, the total pseudorange needs to be formed from the hardware codephase. Conventional GPS receivers determine the integer millisecond and so-called z-count.

When signal levels are roughly no better than −145 dbm to −150 dbm, a practical high-sensitivity GPS receiver can employ pattern-matching tricks to get a z-count or integer millisecond for an anywhere-fix.

SUMMARY OF THE INVENTION

It is therefore an object of the present invention to provide a high-sensitivity GPS receiver that can operate with signal levels under −150 dbm.

Briefly, a navigation-satellite receiver embodiment of the present invention depends on a network server to occasionally provide key pieces of information needed during its initialization. The navigation-satellite receiver critically maintains its position uncertainty, sigmaPos, to under 150-km. Therefore, at least every five minutes, the navigation-satellite receiver uses a network connection to download all the ephemeris information for all the operational SV's. The power-off time uncertainty, sigmaTime, is kept under one millisecond by running a real-time clock with a software-compensated crystal oscillator reference. Such information is instantly available at power-up to reduce the time necessary to produce a first fix when receiver signal levels are under −150 dbm even for the strongest SV.

An advantage of the present invention is that a system and method are provided for faster initialization of navigation satellite receivers.

Another advantage of the present invention is that a system and method are provided for improving the sensitivity navigation satellite receivers.

These and other objects and advantages of the present invention will no doubt become obvious to those of ordinary skill in the art after having read the following detailed description of the preferred embodiments which are illustrated in the various drawing figures.

IN THE DRAWINGS

FIG. 3 is a flowchart of a high sensitivity receiver method embodiment of the present invention.

DETAILED DESCRIPTION OF THE PREFERRED EMBODIMENT

Figure 1:
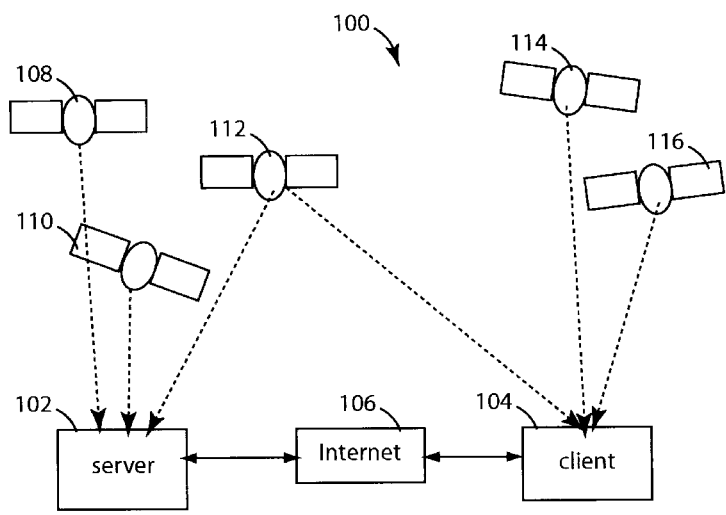
FIG. 1 is a functional block diagram of a network system embodiment of the present invention wherein a server is supporting a client with information communicated over the Internet.

FIG. 1 illustrates a network system 100, in an embodiment of the present invention, that includes a reference-station server system 102, a GPS measurement platform 104, and an intervening computer network 106 such as the Internet. The server system 102 includes a navigation satellite receiver that has locked onto and is tracking a constellation of navigation satellite vehicles (SV's) 108, 110, and 112. Some of these may also be visible to the GPS measurement platform 104. Another constellation of navigation satellites, including 114 and 116 is visible to client system 104. The GPS measurement platform 104 includes its own navigation satellite receiver, but such may not has yet locked onto and be tracking its constellation of navigation satellites 112, 114, and 116.

In general, there are four types of GPS measurement platform embodiments of the present invention that are categorized by how independent of the server they can operate. An autonomous client can function and provide navigation solutions to a user with only minimal help from the server 106, e.g., differential correction data. A demi-client needs more help, e.g., polynomial models that simplify ephemeris and time bias calculations. A thin-client lays off just about all the navigation calculations on the server 106, and basically provides only observational measurements from its point of view of the SV constellation. The navigation solutions are returned for local display if a user is there and wants to see them.

The fourth type of client is a high-sensitivity GPS receiver connected as client 104, herein referred to as OMNI. Such fourth type is the one of interest here.

Figure 2:
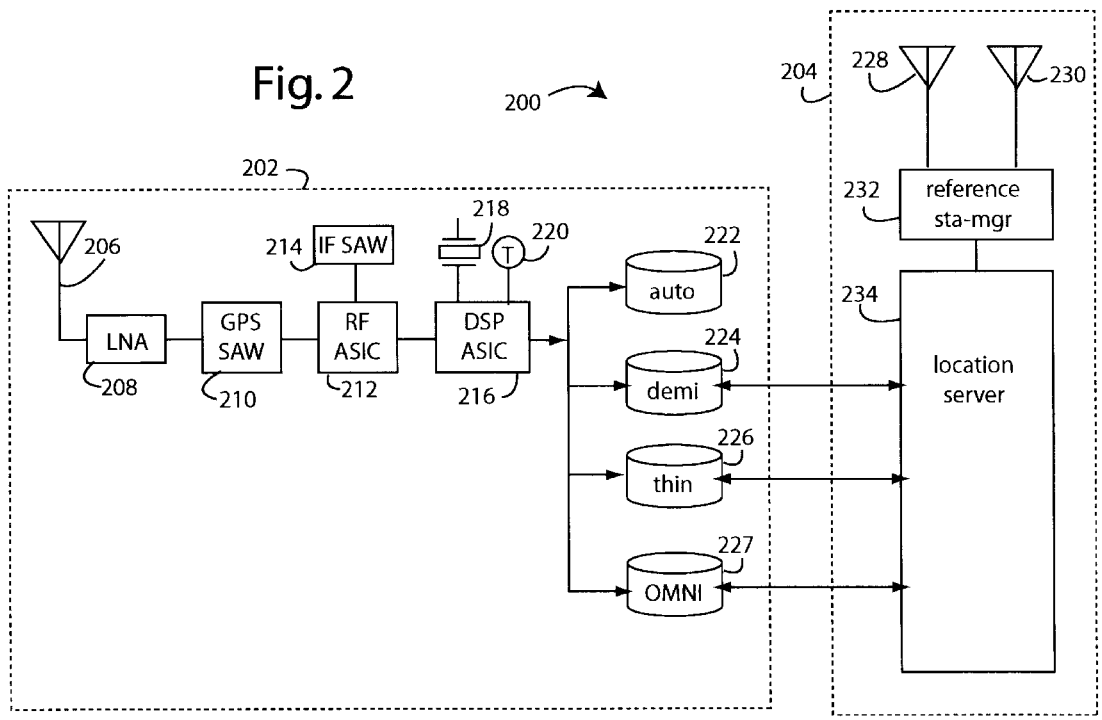
FIG. 2 is a functional block diagram of a navigation platform embodiment of the present invention.

FIG. 2 represents a OMNI-client navigation satellite receiver network embodiment of the present invention, and is referred to herein by the general reference numeral 200. The OMNI-client navigation satellite receiver network includes at least one navigation platform 202 supported by a network server 204.

Each GPS measurement platform 202 typically comprises a GPS antenna 206, a low-noise amplifier (LNA) 208, a GPS surface acoustic wave (SAW) filter 210, a radio frequency (RF) application specific integrated circuit (ASIC) 212 with an intermediate frequency (IF) SAW-filter 214, a digital signal processor (DSP) 216, a reference crystal 218, and a reference-crystal temperature sensor 220.

An autonomous client 222 can function and provide navigation solutions to a user with next to no help from the server 204. A demi-client 224 needs help, e.g., polynomial models that simplify ephemeris and time bias calculations.

A thin-client 226 does not burden its local host with navigation solution processing. It lays off just about all the navigation calculations on the server 204, and basically provides only observational measurements from its point of view of the SV constellation. The navigation solutions are returned for local display if a user is there and wants to see them. In a thin-client 226, the DSP is a shared part with some other non-GPS application. As such, multi-threaded application programs are not needed at the client and only simple program loops are executed.

An OMNI client 227 runs almost fully autonomously, but periodically collects a full set of ephemeredes over the computer network. It further operates during power off to keep its position uncertainty, sigmaPos, under 150-km when it is powered back up. These conditions allow high sensitivity operation where much finer search steps are used to find signal power and each step has a long dwell. The OMNI client 227 also benefits greatly if the crystal oscillator 218 is software compensated using temperature measurements by temperature sensor 220. A real time clock is kept running that is accurate to better than one millisecond of true time each time the navigation platform 202 is powered-up.

The local reference oscillator crystal 218 will has a frequency drift error that will vary as a function of temperature. The reference-crystal temperature sensor 220 is used to measure the temperature of the local reference oscillator crystal 218. The first use is to collect data to build curve during manufacturing calibration when the navigation platform 202 is initialized and tracking SV's. The subsequent use is to provide an index value so a ninth-order polynomial equation can be computed from stored coefficients while the navigation platform 202 is initializing and trying to lock onto its first SV.

The server 204 typically comprises a number of reference station antennas 228 and 230 that provide GPS signal inputs to a reference station manager 232. A location server 234 can provide support information to the demi-client 224, thin-client 226, and OMNI-client 227 for improved time-to-first-fix and position solution quality. In the case of the OMNI-client 227 operating in high-sensitivity mode, the ephemerid information collected and forwarded by the server 204 enables anywhere fixes with signal levels from SV's under −150 dbm.

A method embodiment of the present invention determines how and when the server 204 is contacted by an OMNI client, e.g., client 104 and navigation platform 202. The server contact must be infrequent and minimized in many situations because the per-byte communication costs are high or the network is only periodically accessible.

When signal strengths are high, the z-count and navigation data bit transition time (BTT) are really measured by collecting NAV-data. The BTT is used to clean-up any codephase roll-overs. Generally the sub-20 msec portion should agree. There is a bit more noise on the BTT than z-count. However, the z-count can be off by one millisecond for a short period of time near where the codephase rolls over.

The OMNI client needs a good time source to reduce sigmaTime to under one millisecond. The 50-Hz NAV-data can be used to do a pattern match and indirectly find time. Such can provide a GPS receiver with an adequate time source when a z-count cannot be demodulated. If there is enough confidence in the pattern match, the integer millisecond, intMs, on an SV can also be determined.

If the starting time uncertainty, sigmaTime, is greater than +/−10 msec, the so-called big delta T term (DT) has to be used in the solution fix. Such increases the number of SV's needed by one. A gridFix method can be used when the position uncertainty, sigmaPos, is under 150-km and the intMs on SV's is not available. A no-Z fix type is used when sigmaTime is greater than 10 msec.

A complete GPS almanac, highAccAlm, is sent by the server with ephemeredes rather than almanacs for all GPS SV's. Another complete GPS almanac, mixAccAlm, can be sent by the server and includes older ephemeredes for SV's it is not currently tracking.

Preferably, a WWserver server is implemented that has continuous observability of the complete GPS constellation. It has enough reference stations with adequate spatial separation to view all SV's around the world at the same time. Server 204 represents a local server, LAserver, that has one or more reference stations that observe only a sub-set of the complete GPS SV-constellation. Therefore an LAserver can not provide highAccAlm, only mixAccAlm.

After turning on, the almanac will include ephemeredes that are actually almanacs. After one 12-hour cycle, some of the almanacs will be replaced with ephemeris based almanacs.

The NAV-data from the GPS SV's can be collected directly down to signal levels as low as −145 dbm. Therefore, the ephemeris, z-count and BTT can be derived at this level. SV's at this level can operate independent of the server and also can be used in a fix that has no requirement on starting position accuracy, e.g., anywhere fix. Pattern matching is necessary starting at −145 dbm and can be carried on down to ass low as −150 dbm. A z-count or intMs can be thereby obtained so the SV can be used in an anywhere fix. However at such signal levels, the ephemeris needs to be obtained over the network 106 from server 102, or their alternative source. Below signal levels of −150 dbm, the NAV-data is not reliable enough for a pattern match. The NAV-data must be obtained from the server 102 or 204, and the SV's with such weak signals can only participate in a fix when the uncertainty is less than 150-km.

During initial SV acquisition, ephemeris level accuracy is not needed. An almanac, or downgraded ephemeris, is adequate to predict the data needed for preposition. Ephemeris level accuracy is also not needed for fixing. A time-out is defined for the ephemeris age for positioning. Such threshold can be relaxed and still maintain respectable positioning if the accuracy degradation as a function of time is properly modeled. The age threshold can be a controllable parameter so that the customer can select the desired level of performance.

NAV-data subframe data from the server 102 is needed for first fix or setting time. After that, subFrames are no longer requested by client 104. The NAV-data decoded by the client 104 can be sent to the server 102 for the server to do the pattern-matching.

A server connection is not needed by OMNI client 104 when there are three or more SV's with signal levels all better than −145 dbm. The time-to-first-fix (TTFF) will be longer if the ephemeris must be collected. In some cases, previously collected ephemeredes can be used.

A server connection is not needed by OMNI client 104 when previously collected ephemeredes for SV's are on-hand and sigmapos is less than 150-km. The minimum numbers of SV's needed depends on sigmaTime. Such time uncertainty can be reduced with a real-time clock (RTC) that is software-compensated for temperature drift. So three SV's are needed with such RTC, and four SV's without the RTC Otherwise, solving for a fix will require that the OMNI client 104 contact the server 102 and request certain information. The NAV-data subframes are needed when the SV's signals are −145 dbm to −150 dbm and sigmaPos>150-km. The intMs for these SV's is needed for them to participate in the first fix. If only three −145 dbm or weaker SV's are available and no other better means of accurate time, pattern matching can be used. A so-called no-Z fix with four SV's is then used.

The ephemeris has to be requested when SV's signals are not stronger than −145 dbm and their ephemeris has timed out. In such case, the fastest TTFF possible is desired.

A main program application can periodically turn-on the GPS receiver and get a fix. Such decides how far the receiver has moved since the last fix, or decides simply if the GPS receiver has left a predefined zone. The time interval between fixes is selected to keep sigmaPos within 150-km so that the intMs is not needed on weak SV's under −145 dbm. Such extends the ability to retain high sensitivity fixes without needing a server connection to request NAV-data subFrames. The timing of the server requests is adaptive. This is needed to provide a quiet client/server connection when there is adequate performance without it.

The OMNI client must evaluate the data it has, the data's age, and the likelihood of acquisition success, e.g., number of SV's and the signal levels. The OMNI client then decides whether to make the connection and what data to request. The adaptivity can be disabled and the server connection can made by explicit commands. A master application may decide to make a server connection every one hour. Thus, for fixes done every five minutes, the twelfth one will make a server connection.

A broadcast type ephemeris service can be used where the master application collects the data and then pushes it into the client through generalized API's. The client can be empowered to make a server connection any time during a session.

FIG. 3 illustrates a method embodiment for an OMNI client comprises several steps, and is referred to herein by general reference numeral 300. First, in a step 302, the ephemeris availability is analyzed and how many high-N SV's with a usable ephemeris for fixing are determined. Such assumes the server almanac, ServerAlm, is good enough to get the high-N and allow accurate prePos.

In a step 304, the SV's are classified by their received signal strengths into "G1" (better than −145 dbm), "G2" (between −145 dbm and −150 dbm), or "G3" (less than −150 dbm).

In a step 306, the number of SV's acquired are counted and sigmaTime and sigmaPos are used to determine if a fix is possible.

In a step 308, the number of SV's are counted that need NAV-data subframes based on its signal level, sigmaTime, and sigmaPos. If these SV's are needed to get the first fix.

In a step 310, a decision is made whether to request a server connection. If not, a step 312 is executed. If a server connection is needed, there are two options, minimized network data traffic, and unlimited.

A step 314 requests the minimum data from the server. For example, if the ephemeris on-hand is current and will be useable for an adequate time into the future, then the server request for it is not needed in the current session.

A step 316 requests a maximum of data from the server. However, as a general rule as much data as possible is requested that will carry farthest into the future. Such makes sense if the number of server connections should be minimized. But once in a server session, as much data as possible can be requested.

A step 318 computes the fix.

Some embodiments of the present invention make the client-to-server handshake controllable and selectable. A status message to the master application is sent that indicates (a) the age of ephemeris and whether some SV's in current high-N has timed out, (b) a tracking classification of SV's into G1, G2, G3 and whether subframes are needed per SV, and (c) the sigmaTime and sigmaPos.

The indoor, high sensitivity operation can be maintained as long the ephemeredes for SV's being tracked are available, and the position uncertainty is less than 150-km so a fix can be obtained without a z-count. An accurate time source such as a real-time clock (RTC) is preferred because the no-Z fix method increases the number of SV's by one. For example, five SV's for three-dimensional fix, and four SV's for a two-dimensional fix. A position fix can be computed using signal measurements that are otherwise too weak to demodulate the 50 bps GPS Navigation data stream.

A software-compensated crystal oscillator (SCXO) should be included for a reasonable time-to-first fix (TTFF). If TTFF is not so important, the frequency search window can be extended to search out a larger frequency error. If the signals are strong enough to reliably demodulate the data in the receiver, then the position range can extend beyond the 150-km.

The RTC, can maintain a millisecond level accuracy obtained from a previous fix even while the client application is not running. The only cost is a slight increase in the sleeping power consumption.

In embodiments of the present invention, the navigation data can be independently demodulated if the signal is strong enough. Such is not possible in the current STI or Global locate designs unless they also add a conventional tracking capability.

Without a server, high-sensitivity position fixing can only be realized if there has been outdoor like signal recently observed, e.g., within the last four hours. Such is because the visible satellites are constantly changing, and the ephemeris accuracy from previous SV orbits will degrade. The level of degradation for each orbit is an important question. The orbit of the spacecraft as well as the trajectory of the satellite clock both has to be accurately modeled. Some historical modeling could extend the usability of an ephemeris into the 12–16 hour range. Such would improve performance somewhat, but the accuracy of the fix would still be difficult to predict.

Prior art high sensitivity receivers depend on continuous connections to a server. These designs derive frequency from the network and their hardware does not has the ability to collect the ephemeris. Such constant server communication can be expensive to maintain.

In practice, high sensitivity GPS navigation is very difficult to maintain all the time without the occasional help of a server. The server provides future ephemeris, and subframes for pattern matching as a time source. Thus, it may be possible not use RTC to save some power consumption between fixes, but the savings in power are relatively small. If the time since the last fix has been many days, then subframes are needed as an alternative time source because the RTC accuracy may begin to degrade.

The time between server updates can be minimized if the GPS receiver interrogates its available data. A call is made to the server only if: the ephemeris data has expired, the signals are weak, and the time since the last fix has passed a limit. If the GPS receiver is tracking strong SV's, then the server call is postponed to see if the ephemeris can be collected and a fix can be computed.

The z-count and BTT are measured by collecting NAV-data. The OMNI-client uses BTT to clean up codephase roll-overs. Generally the sub-20 msec portion should agree. There is a bit more noise on the BTT than z-count. However, the z-count can be off by one millisecond for a short period of time near where the codephase rolls over.

The NAV-data subFrames at 50-Hz are needed to do a pattern match. Such can provide a receiver time source when the OMNI-client cannot demodulate a z-count. It can also potentially provide an integer millisecond on an SV if there is enough confidence in the match. The OMNI-client need to define a pattern match condition that would provide this confidence.

The integer millisecond (intMs) is derived by the OMNI-client either by demodulating a z-count, or by a high-confidence pattern match. The sigmaPos is the starting position uncertainty. The sigmaTime is the starting time uncertainty. When greater than +/−10 msec, the OMNI-client has to include the big delta T term (DT) in the fix. Such increases the number of SV's needed by one.gridFix—cancel b: the fix method used when sigmaPos less than 150-km and the OMNI-client don't has intMs on SV's. no-Z fix: This is the fix type when sigmaTime is greater than 10 msec. The OMNI-client solve for the big delta T term (DT) in the fix.

highAccAlm: this is a complete GPS almanac sent by the server, but with ephemeredes rather than almanacs for all GPS SV's.

mixAccAlm: this is a complete GPS almanac sent by the server, but with older ephemeris for the SV's it is not currently tracking.

WWserver: this is a server that has continuous observability of the complete GPS constellation because it has enough reference stations with adequate spatial separation to view all SV's at the same time.

LAserver: this is a local server that has one or more reference stations that can only observe a sub-set of the complete constellation. It can never serve a highAccAlm. It can only serve a mixAccAlm. After turning on, the almanac will include of ephemeredes and actually almanacs. After one 12 hour cycle, some of the almanacs will be replaced with ephemeris based almanacs.

ServerAlm: this is a complete almanac and can be either a highAccAlm or a mixAccAlm depending on whether the OMNI-client has a WWserver or an LAserver.

Downgraded ephemeris: After a predefined age with respect to ephemeris Toe (time of ephemeris) the OMNI-client ignore the sinusoidal terms in the ephemeris and the accuracy of the almanac down modes to the effective accuracy of the almanac.

---

Define the following signal levels and what data can be collected:
G1: The OMNI-client can collect NAV-data up to −145 dbm. The OMNI-client also can collect ephemeris, z-count and BTT at this level. SV's at this level can operate independent of the server and also can be used in a fix that has no requirement on starting position accuracy (anywhere fix).
G2: The OMNI-client can do pattern matching up to −150 dbm. Such means the OMNI-client can get a z-count or intMs so the -continued SV can participate in an anywhere fix. However at this level, the OMNI-client need to get the ephemeris from an alternate source.
G3: Below the −150 dbm level, the NAV-data is not reliable enough for a pattern match. The OMNI-client must get NAV-data from the server, and these SV's can only participate in a fix where the uncertainty is 150-km or better.

---

For acquisition, the OMNI-client do not need ephemeris level accuracy. An almanac (or downgraded ephemeris) is adequate to predict the data needed for preposition.

For fixing, the OMNI-client do need ephemeris level accuracy. The OMNI-client currently define a time-out for the age of the ephemeris for positioning. The OMNI-client may be able to relax this threshold and still maintain respectable positioning if the OMNI-client can properly model the accuracy degradation as a function of time. The OMNI-client can also make the age threshold a controllable parameter so that the customer can select the desired level of performance.

For first fix or setting time, subframe data may be needed from the server in order to make a pattern match. However, after that time, the OMNI-client don't need to continue requesting subFrames.

The OMNI-client should consider sending the decoded NAV-data to the server and has the server do the pattern match and send back the result. Such would probably be much less data. The OMNI-client should request this work be scheduled as a server project also for the demi client. The OMNI-client should also keep both approaches for flexibility.

---

Cases where the CMNI-client don't need a server connection:
The OMNI-client has 3 or more G1 SV's. The TTFF will be longer of course if the OMNI-client need to collect ephemeris.
In some cases, the OMNI-client can re-use previously collected ephemeris.
The OMNI-client enough G1-Gthree SV's and the OMNI-client has previously collected ephemeredes for these SV's and sigmaPos less than 150-km. Minimum numbers of SV's
three SV's with RTC
four SV's without RTC

---

If these above conditions are not satisfied, then the OMNI-client will need to contact the server to get a fix. The OMNI-client then define what data needs to be requested.

---

Cases where the OMNI-client need to request subframes:
The OMNI-client has G2 SV's and sigmaPos > 150-km. The OMNI-client will need to get intMs for these SV's in order for them to be able to participate in the first fix.
The OMNI-client has only 3 G2 or weaker SV's and the OMNI-client has no other means of accurate time. The OMNI-client will accomplish this with pattern matching if possible.
[The OMNI-client can do the no-Z fix with four SV's].
Cases where the OMNI-client has to request ephemeris:
The OMNI-client has G2 or weaker SV's and their ephemeris has timed out.
The OMNI-client want the fastest TTFF possible.

---

A master application can decide periodically to turn-on the receiver and get a fix. Generally, it tries to decide how far the receiver has moved since the last fix or if it has left a predefined zone.

The time interval between fixes is selected to keep sigmaPos within 150-km so that the OMNI-client don't need intMs on the weak SV's (G2, G3). Such extends our ability to retain high sensitivity fixes without needing a server connection to request subFrames.

The server requests is made adaptively. This is needed to provide a quiet client/server connection when there is adequate performance without it. Such means the client must evaluate the data is has, its age, and also the acquisition success (number of SV's and the signal levels). Based on this data, it then decides whether to make the connection and what data to request.

The adaptivity can be disabled and the server connection can made by explicit commands. The master application may decide to make a server connection every one hour. Thus, the OMNI-client may do fixes every five minutes, and then the every $12^{th}$ gets to make a server connection.

The OMNI-client may perform a broadcast type ephemeris service where the master application collects the data and then pushes it into the client through generalized API's.

The OMNI-client can also enable that the client makes a server connection any time during the session.

In the case where the position sigma has grown above 150-km, pattern matching can be used to compute integer millisecond. The OMNI-client combines the following data into an algorithm to compute integer millisecond. A pattern match offset is the outcome of the search in time to correlate the demodulated data bits with the subframe data supplied by the server. The OMNI-client will use repeated results in the estimator. A pattern match good bit count comes each time the OMNI-client get a pattern match, the OMNI-client can look to see how many bits agreed. The OMNI-client use this to weight the confidence of each pattern match. The OMNI-client will then combine the results to make an overall estimate.

The BTT result and BTT status are formed from the TSM histogram. The BTT is an estimate of the sub 20-millisecond portion of the integer millisecond. It can be used to filter the intMs computed with pattern match or as an independent verifier. The OMNI-client can monitor the code phase to look for roll-overs. The OMNI-client need this to allow the integer millisecond to change by one millisecond. The OMNI-client can use the Doppler to verify the direction of the change of integer millisecond.

The OMNI-client will take the following strategy when sigmapos>150-km.

The OMNI-client first see if the OMNI-client has enough strong SV's with ephemeris that can measure a z-count. The OMNI-client is able to do this down to −145. If the OMNI-client has enough of these SV's, the OMNI-client will not make a server request.

If the OMNI-client don't has enough strong SV's (−145 dBm and higher) AND the OMNI-client are tracking weaker SV's, then the OMNI-client MUST make a server request since the pattern matching method is the only method the OMNI-client has to compute intMs.

The OMNI-client take the following strategy when sigmaPos less than 150-km.

If the OMNI-client has enough SV's based on our time source, and their ephemeris is fresh, the OMNI-client don't make a server request.

If the OMNI-client has strong SV's and can collect ephemeris., then the OMNI-client wont make a server request. Such will slow down TTFF. Thus, the OMNI-client can override this and always request ephemeris to speed up the TTFF The OMNI-client first define a minimum interval (OMNIminRequestInterval) so that the OMNI-client do not request data any faster than this period. This only applies to the same session. The periodic fix rate should be used to limit requests between sessions.

The OMNI-client determine the status of the SV's the OMNI-client are tracking. The OMNI-client count the number of SV's with and without fresh ephemeris. The OMNI-client also count the number according to whether the SV is strong enough to collect good NAV-data or not.

The OMNI-client determine if the RTC is fresh or not. If it is and the sigmaPos less than 150-km, then it reduces the number of SV's the OMNI-client need to fix.

The OMNI-client also check if a two-dimensional fix is okay for OMNI. If it is configured, then the OMNI-client also reduce the number of SV's the OMNI-client need, and possibly minimize the server traffic. However, the OMNI-client the position accuracy will probably be degraded according to the terrain where the customer is operating the receiver.

If the sigmaPos less than 150-km then, the OMNI-client computes the number of needed SV's.

If the number with ephemeris is enough, then the OMNI-client don't contact server.

If the OMNI-client has enough strong SV's, the OMNI-client wait to collect the data and the OMNI-client doesn't contact the server. If a faster TTFF is requested, then the noServerIfStrong bit is not set and the OMNI-client will request ephemeris rather than waiting to collect it.

If the OMNI-client don't has enough usable SV's, then the OMNI-client first wait a period to make sure the OMNI-client has given the search time to complete. After waiting, the OMNI-client continue the logic.

The OMNI-client has now determined that the OMNI-client cannot do a fix without some data from the server. The OMNI-client only connect with the server if there are enough SV's tracking so that the server communication will guarantee that the OMNI-client can do a fix. However, if the OMNI-client are only tracking one or two SV's, then a server connection wont help anyway, so the OMNI-client just wait until the conditions change.

If the combination of the SV's the OMNI-client are tracking with fresh ephemeris and the ones the OMNI-client are tracking but don't has fresh ephemeris is enough to get a fix, then the OMNI-client decide to connect to the server. The OMNI-client then decide what data to collect.

One option is request all ephemeris. Such optimizes the fixing time in the future and also minimize the chance the OMNI-client will request again quickly. A second option is to request only the ALL ephemeris that are not fresh, that is all from the 32. Such will reduce server traffic but may mean the OMNI-client has to select again soon when a new SV becomes visible.

A third option is to only request the ones not fresh that are currently visible. Such will further reduce server traffic but will mean the OMNI-client will has to request data soon.

The OMNI-client then decide if the OMNI-client need subframe data. The OMNI-client has the following options that apply only when sigmaPos less than 150-km:

If the OMNI-client has RTC and the OMNI-client are configured to never request subframes when RTC is good, then the OMNI-client don't request subframes. Such is selected with the bit noSubframeWithFreshRTC of subframeRequestConfig. If the OMNI-client has a strong SV, then the OMNI-client can wait to receive a z-count if the OMNI-client set the bit noSubframeWaitForzcount of subframeRequestConfig.

If the OMNI-client has five SV's, then the OMNI-client can force a no-Z fix and request no subframes if the bit nozfixInsteadOfPatternMatch of subframeRequestConfig is set.

The OMNI-client can also set the bit noSubframesEver of subframeRequestConfig so that the OMNI-client never request subframes.

The OMNI-client also never request subFrames after the OMNI-client has good three-dimensional fix since the OMNI-client don't need to measure intMs after this point.

If the OMNI-client decide to collect subframes then the OMNI-client has the following options:

Request subframes for all subframes using the all-HighNsubframes bit in subframeRequestConfig.

Request only subframes for the strongest SV with bit onlyStrongestSV. Such would obviously only apply when sigmaPos less than 150-km.

Request subframes for SV's with a specified range of EMU with bit onlyAboveThresh. Such is useful since the OMNI-client don't need subframes for strong SV's unless the OMNI-client are trying to speed up TTFF, so the OMNI-client can reduce server traffic.

If sigmaPos>150-km, the major difference is that the OMNI-client need integer millisecond for any satellite in the first fix. The OMNI-client get this by either decoding a z-count for a strong SV or a specialized pattern match algorithm for weak SV's. Thus, if too many SV's are weak, or there are not enough strong, the OMNI-client are force to communicate with the server.

The OMNI-client compute the number of SV's needed based on the two-dimensional bit fix2Dokay. Since the OMNI-client are not doing the no-Z count, the OMNI-client only need four SV's to do a three-dimensional fix or three SV's for a two-dimensional fix.

If the OMNI-client has enough strong SV's and the OMNIconfig bit noServerIfStrong is set, then the OMNI-client can do a fix without the server.

Otherwise, the OMNI-client has to connect to the server. However, as in the sigmaPos less than 150-km, the OMNI-client only connect when the OMNI-client are tracking enough SV's to that the connection is likely to get a fix. If the OMNI-client don't has enough usable SV's, then the OMNI-client first wait a period to make sure the OMNI-client has given the search time to complete. After waiting, the OMNI-client continue the logic.

The OMNI-client has now determined that the OMNI-client cannot do a fix. The OMNI-client only connect with the server if there are enough SV's tracking so that the server communication will guarantee that the OMNI-client can do a fix. However, if the OMNI-client are only tracking one or two SV's, then a server connection wont help anyway, so the OMNI-client just wait until the conditions change.

If the number of SV's tracking without ephemeris and number with ephemeris is enough to do a fix, then the OMNI-client will connect with the server. Otherwise the OMNI-client wait.

If the number was enough, the OMNI-client first check what ephemeris the OMNI-client need. The OMNI-client apply the bit masks for the selected tuning for requestAllEphem, requestAllNotFresh, and requestTrackNotFresh as described in the less than 150-km case.

As long as the OMNI-client are not doing fixing, then the OMNI-client must also collect some subframes for the weak SV's. The OMNI-client applies the two bit masks (allHighNsubframes, onlyAboveThresh) to decide tune this application.

The OMNI-client looks at the configuration for how to request corrections models, e.g., getting DGPS fixes in the OMNI client. The OMNI-client has three configurations.

The OMNI-client always request corrections with the bit DGPS always in the correctionsRequestConfig byte even if the OMNI-client decided not connect to the server for ephemeris or subframe.

Alternatively, DGPS corrections can be requested with the DGPSnormal bit only when the OMNI-client has already decide to make a server connection for the ephemeris or NAV-data.

The SPV and ASPV data according to the requestSPV and request ASPV bits in the OMNIconfig bits.

The following pseudocode describes a client that can use the server at four different levels: AUTO, DEMI, THIN, and OMNI.

```
Pseudocode
If (OMNImodeControl & OMNIno) = 0
    not in omni mode
    If (auto client) never make server request
    Else if (demi) always make server request
    Else if (thin) always make server request
    Return
}
/* The following logic applies when OMNI mode is enabled. Selective server requests are
based on
/* Check minimum server request interval */
if (delta time since last server request < OMNIminRequestInterval) {
    /* Wait a minimum time between requests */
    return
}
/* Count number strong SV's that the OMNI-client are currently */
numTrackStrong = 0
for (I=0; I<trackListCnt; I++)
    if (SV[I] is tracking && (outdoor EMU[I] > thresh to collect NAV-data))
        numTrackStrong++
/* Count number of tracking SV's with and without fresh ephemeris */
numTrackWithEph = 0
numTrackStrongWithEph = 0
numTrackWeakWithEph = 0
numTrackWithoutEph = 0
numTrackStrongWithoutEph = 0
numTrackWeakWithoutEph = 0
for (I=0, I<trackListCnt; I++) {
    if(SV[I] is tracking) {
```

-continued

```
            if (ephemAge[I] < fresh ephem threshold)) {
                /* Ephemeris is fresh */
                numTrackWithEph++
                /* Identify also strong and weak with ephem */
                if (outdoor EMU[I] > thresh to collect NAV-data))
                    numTrackStrongWithEph++
                else
                    numTrackWeakWithEph++
            else {
                /* Ephemeris is not fresh */
                numTrackWithoutEph++
                /* Identify also strong and weak without ephem */
                if(outdoor EMU[I] > thresh to collect NAV-data))
                    numTrackStrongWithoutEph++
                else
                    numTrackWeakWithoutEph++
            }
        }
}
/* Define that RTC accuracy is good enough to set time to +/-10msec.*/
if (time RTC has been running < thresh) freshRTC = TRUE
else freshRTC = FALSE
/* Determine now whether the OMNI-client connect or not. */
if(sigmaPos < 150-km) {
    /*
    At this level, the OMNI-client will use the grid search method. Such doesn't require
integer    millisecond for each SV. Thus, as long as the OMNI-client don't need
subframes to get time,  the OMNI-client wont request them.
    /*
/*
Determine number of SV's needed to get a three-dimensional fix using the grid search. If the
OMNI-client has a strong enough SV to get a z-count, or has good RTC time, only need 4.
Otherwise, the OMNI-client use the no-Z fix method that needs five SV's to get a three-
dimensional fix
*/
if (strongCnt or freshRTC) numNeeded = 4
else numNeeded = 5
/* If API can input altitude or two-dimensional fix is okay, reduce numNeeded by one */
if (userInputAltitude or fix2Dokay) numNeeded = numNeeded – 1
    /*
    Handle conditions where the OMNI-client has enough SV's that has ephemeris or that
are  strong enough to collect ephemeris
    */
    if((numTrackWithEph >= numNeeded) || ((OMNIconfig & noServerIfStrong)
    && (numTrackWithEph + numTrackStrongwithoutEph >= numNeeded))))
        /* don't need to contact server */
        needServerContact = FALSE
    else {
        /* The OMNI-client will need to get data from the server */
        needServerContact = TRUE
        /*
        First make sure that the OMNI-client has waited at least one pass of the total
search       range for all high-N SV's before the OMNI-client request. This has
the benefit that it      makes sure the OMNI-client has tried to acquire all
SV's over the defined first search     window before the OMNI-client request
a server update.
        */
        if (has not received didOnePass for first search of high-N with indoor
        sensitivity) {
            wait before contacting server
            return
        }
        /*
        Only request when the OMNI-client are tracking SV's and when it has high
likelihood to     give us enough SV's to get a fix.
        */
        if ((numTrackWeakWithoutEph > 0)
        && ((numTrackWeakWithoutEph + numTrackWithEph)>=numNeeded)))
            /*
            Contacting the server will help. Now the OMNI-client need to decide
what the OMNI-client          need to collect.
            */
            /* Get ephemeris according to how it is configured */
            if (ephemRequestConfig & requestAllEphem)
                request all current ephemeris
            else if (ephemRequestConfig & requestAllNotFresh)
                request all SV's whose ephem age is old
            else if (ephemRequestConfig & requestTrackNotFresh)
                request all SV's tracking whose ephem age is old
```

-continued

```
                else
                        don't request any ephemeris
                /* Look for reasons to avoid getting subframes */
                If ((((freshRTC = TRUE) && (subframeRequestConfig
                                & noSubframeWithFreshRTC))
                   || ((numTrackStrong > 0) && (subframeRequestConfig
                                & noSubframeWaitForZcount))
                   || ((numTracking >= 5) && (subframeRequestConfig
                                & noZfixInsteadOfPatternMatch))
                || (subframeRequestConfig & noSubframesEver))
                || (has first confident three-dimensional fix)) {
                        don't collect subframes
                }
                else {
                        /* Get subframes according to how it is configured */
                        if (subframeRequestConfig & allHighNsubframes)
                                request subframes for all SV's in high-N
                        else if(subframeRequestConfig & onlyStrongestSV)
                                request subframes for strongest SV only
                        else if (subframeRequestConfig & onlyAboveThresh)
                                request subframes for any tracking SV with an
                                (subframeLowEMUthresh < EMU[I] <
                        subframeHighEMUthresh)
                        else
                                don't request any subframes
                }
            }
        }
    }
}
else { /* sigmaPos > 150-km */
    /*
        Handle the case that our position sigma is high. In this case, to get a fix, the OMNI-
    client has    to has intMs for each SV to participate in the first fix. After the first fix, the
    OMNI-client can             compute intMS for other SV's not in the first fix. So the
    challenge is to get a fix        with strong SV's where the OMNI-client can measure intMs
    with a z-count, or with weak SV's   where the OMNI-client has use pattern matching to
    generate an intMs. Such will require requesting subframes from the server.
    */
    /*
    Determine number of SV's needed to get a three-dimensional fix. Since all SV's need to has
    intMs, the OMNI-client assume that the OMNI-client know time enough.
    */
    numNeeded = 4
    /* If API can input altitude or two-dimensional fix is okay, reduce numNeeded by one */
    if (userInputAltitude or fix2Dokay) numNeeded = numNeeded − 1
        /*
        Handle conditions where the OMNI-client has enough SV's that has ephemeris and
    that are   strong so the OMNI-client get intMs without the server
        */
        if((OMNIconfig & noServerIfStrong)
        && (numTrackStrongWithEph >= numNeeded)))
                /* don't need to contact server */
                needServerContact = FALSE
        else {
                /* The OMNI-client will need to get data from the server */
                needServerContact = TRUE
                /*
                First make sure that the OMNI-client has waited at least one pass of the total
    search         range for all high-N SV's before the OMNI-client request. This has
    the benefit that it       makes sure the OMNI-client has tried to acquire all
    SV's over the defined first search       window before the OMNI-client request
    a server update.
                */
                if (has not received didOnePass for first search of high-N with indoor
                sensitivity) {
                        wait before contacting server
                        return
                }
                /*
                Only request when the OMNI-client are tracking SV's and when it has high
    likelihood to      give us enough SV's to get a fix.
                */
                if ((numTrackWithoutEph > 0)
                && ((numTrackWithoutEph + numTrackWithEph) >= numNeeded)))
                        /*
                        Contacting the server will help. Now the OMNI-client need to decide
    what the OMNI-client                need to collect.
                        */
                        /* Get ephemeris according to how it is configured */
```

-continued

```
            if (ephemRequestConfig & requestAllEphem)
                request all current ephemeris
            else if (ephemRequestConfig & requestAllNotFresh)
                request all SV's whose ephem age is old
            else if (ephemRequestConfig & requestTrackNotFresh)
                request all SV's tracking whose ephem age is old
            else
                don't request any ephemeris
            /*
            The OMNI-client need to request subframes for all tracking SV's that
are weak.
            /* Look for reasons to avoid getting subframes */
        if (has first confident three-dimensional fix) {
                don't collect subframes
            }
            else {
                /* Get subframes according to how it is configured */
            if (subframeRequestConfig & allHighNsubframes)
                request subframes for all SV's in high-N
            else if (subframeRequestConfig & onlyAboveThresh)
                request subframes for any tracking SV with an
                (subframeLowEMUthresh < EMU[I] <
            subframeHighEMUthresh)
            else
                don't request any subframes
            }
            }
        }
}
/*
Now decide if the OMNI-client should request corrections. Handle case where the OMNI-
client don't need to connect for ephemeris or subframes but the OMNI-client still want
DGPS accuracy.
*/
if (correctionsRequestConfig & DGPSalways) && (needServerContact == FALSE)
    request corrections only
    needServerRequest = TRUE
else if((correctionsRequestConfig & DGPSnormal) && (needServerContact == TRUE))
    /* Request corrections along with other requested data */
/* Check SPV model request */
if(needServerContact == TRUE) && (OMNIconfig & requestSPV)
    request SPVs for high-N
/* Check ASPV model request */
if(needServerContact == TRUE) && (OMNIconfig & requestASPV)
    request SPVs for high-N
```

OMNI API Parameters
Summary of OMNI parameters defined in this algorithm:
Data for corrections request

| | | |
|---|---|---|
| CorrectionsRequestConfig | | /* control byte with following bit masks */ |
| Values: | | |
| DGPSalways = 0x01 | | /* request every session */ |
| DGPSnormal = 0x02 | | /* request only when requesting eph or subf */ |

Data for subframe requests

| | | |
|---|---|---|
| subframeRequestConfig | | /* Control byte *with following bit masks */ |
| only set ONE of these bits: | | |
| allHighNsubframes | | =0x01 |
| onlyStrongestSV | | =0x02 /* Only applies when sigmaPos < 150-km */ |
| onlyAboveThresh | | =0x04 |
| noSubframesEver | | =0x08 /* Only applies when sigmaPos < 150-km */ |
| can set any combination of these bits: | | |
| noSubframeWithFreshRTC | | =0x10 /* Only applies when sigmaPos < 150-km */ |
| noSubframeWaitForZcount | | =0x20 /* Only applies when sigmaPos < 150-km */ |
| noZfixInsteadOfPatternMatch | | =0x40 /* Only applies when sigmaPos < 150-km */ |
| subframeLowEMUthresh | | /* A byte 0–255 */ |
| subframeHighEMUthresh | | */ A byte 0–255 */ |

Data for ephemeris request

| | | |
|---|---|---|
| ephemRequestConfig | | /* Control byte with following bit masks */ |
| only set ONE of these bits | | |
| requestAllEphem | =0x01 | |
| requestAllNotFresh | =0x02 | |
| requestTrackNotFresh | =0x04 | |

General data for OMNI mode
OMNIconfig

| | | |
|---|---|---|
| OMNImodeON | 0x01 | /* Key control bit. Otherwise, the OMNI-client default |
| fix2Dokay | 0x02 | /* Means first two-dimensional fix is okay */ |
| requestSPV | 0x04 | /* Request SPVs along with request */ |
| requestASPV | 0x08 | /* Request ASPVs along with request */ |
| noServerIfStrong | 0x10 | /* If set, and the OMNI-client has strong SV's, the |
| OMNI-client wait to collect | | data rather than connecting with |

-continued

```
server. Such slows
                        the TTFF but reduces server requests */
Other OMNI parameters
OMNIminRequestInterval  /* request no faster than this interval: 0–255 secs */
```

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method of high-sensitivity operation of a navigation satellite receiver that can connect to a server over a network, the method comprising the steps of:

measuring each satellite vehicles (SV's) received signal strength;

classifying each measured SV's signal strength according to strong, medium, and weak;

if said SV signal strength is classified as strong, then downloading NAV-data from a corresponding SV to collect ephemeris, z-count and navigation data bit transition time (BTT);

if said SV signal strength is classified as medium, then using NAV-data pattern matching to get a z-count or integer millisecond, and fetch a corresponding ephemeris from a server;

if said SV signal strength is classified as weak, fetching both NAV-data and ephemeris from said server; and computing a navigation fix.

2. The method of claim 1, wherein:

the step of classifying is such that strong is defined as a signal strength that exceeds −145 dbm.

3. The method of claim 1, wherein:

the step of classifying is such that medium is defined as a signal strength that is in the range of −145 dbm to −150 dbm.

4. The method of claim 1, wherein:

the step of classifying is such that weak is defined as a signal strength that is less than −150 dbm.

5. The method of claim 1, further comprising the steps of:

lacking ephemeris information; and computing a preposition for SV acquisition using an almanac or downgraded ephemeris.

6. The method of claim 1, further comprising the steps of:

limiting the age of ephemeris information that can be used before computing a fix.

7. A method of high-sensitivity navigation-position fixing with infrequent and minimized server contact, the method comprising the steps of:

analyzing ephemeris availability;

classifying SV's by their received signal strengths;

counting the number of SV's acquired using sigmaTime and sigmaPos to determine if a fix is possible;

counting the number of SV's that need NAV-data subframes based on its signal level, sigmaTime, and sigmaPos;

deciding whether to request a server connection, or to request a minimum data from said server connection, or to request a maximum of data from the server; and computing a navigation fix from the data obtained.

* * * * *